Patented Jan. 8, 1952

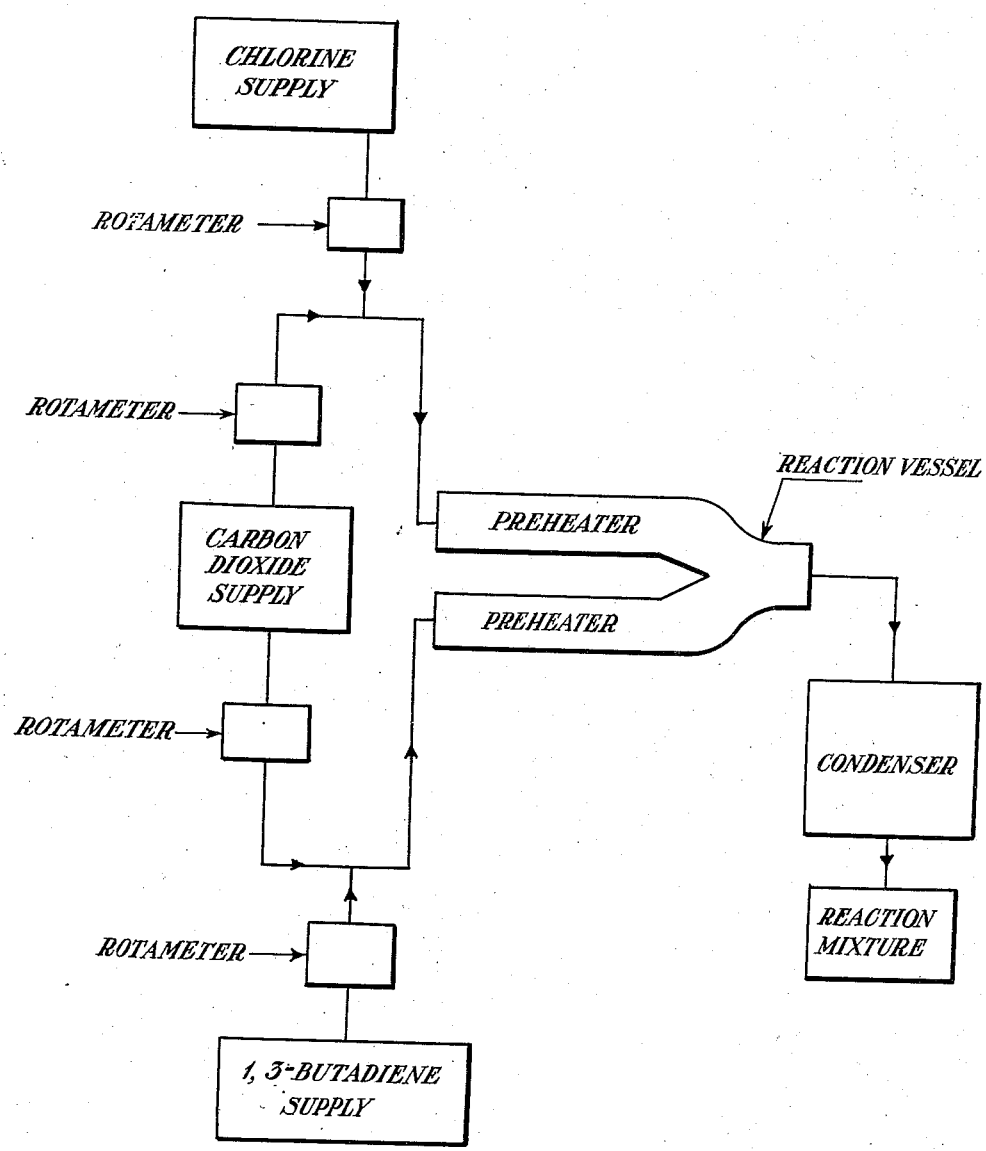

2,581,929

UNITED STATES PATENT OFFICE 2,581,929

CHLORINATION OF BUTADIENE

Kenneth C. Eberly, Akron, and Robert J. Reid, Canal Fulton, Ohio, assignors to The Firestone Tire & Rubber Company, Akron, Ohio, a corporation of Ohio Application December 6, 1948, Serial No. 63,684

3 Claims. (Cl. 260—655)

This invention relates to the high-temperature chlorination of 1,3-butadiene. It includes the process and its product.

At room temperature 1,3-butadiene adds chlorine to produce 1,2,3,4-tetrachlorobutane. High-temperature chlorination effects substitution with side reactions, producing a mixture of chlorine-containing products. Polymerization of the mixture yields resinous products. Copolymerization of the mixture with other monomers yields products the properties of which depend upon the other monomer or monomers employed.

The heat of reaction of undiluted 1,3-butadiene with chlorine at high temperatures is such that the reaction mixture ignites. This ignition may be inhibited by the use of diluents.

According to this invention the chlorination is effected at a temperature of 350 to 450° C. in the presence of an inert gas. Nitrogen, carbon dioxide or other inert gas may be employed. In reacting the chlorine and 1,3-butadiene, 2 to 3 volumes of butadiene are used to 3 volumes of chlorine. One to three volumes of the diluent is used for each volume of reactant.

The reaction is accompanied by carbonization and fog formation. At lower temperatures than 350° C. at which no fogging occurs, little or no substitution takes place. At 450° C. the yield of liquid is less than at 350° C. Using equal volumes of chlorine and butadiene a high percentage of underchlorinated product is produced. Using two volumes of chlorine for one volume of butadiene a high chlorinated product is obtained. A short reaction time gives a higher yield of liquid than a prolonged reaction period. A reaction period of about 0.25 to 4 seconds is recommended for commercial operation. When the gases are brought together too quickly, as by directing streams of the gases toward one another from diametrically opposite directions, lower yields are obtained than if the two streams are brought together at an angle of a few degrees, probably because of high local heat of reaction resulting in local overheating.

It is desirable to dilute both reactants. The reacted gas is quickly cooled and condensed after the reaction, and the condensate treated with a polymerization inhibitor to limit polymerization losses. The reaction product contains mono-, di-, tri- and tetrachloro products in addition to tar. There is little, of any, substitution on the non-terminal carbons of the 1,3-butadiene. There is a high percentage of chlorine-containing butadienes in the reaction product.

The accompanying drawing illustrates more or less diagrammatically the type of reaction equipment employed. The streams of the two gases are brought together at an angle of a few degrees. A reaction tube 10 cm. long is preferable to a reaction tube 70 cm. long. The preheaters may be several times as long as the reaction vessel, and preheaters about 60 cm. long were satisfactory. For commercial use, preheaters 10 to 20 feet long with a reaction chamber six inches to two feet long, is recommended. Gradual mixing of the preheated gases gave a higher yield of liquid than rapid mixing. The rotameters measure the amounts of gases employed.

Example

Two volumes of 1,3-butadiene mixed with 6 volumes of carbon dioxide were preheated and mixed with 3 volumes of chlorine mixed with 9 volumes of carbon dioxide similarly preheated. A tube measuring 19 mm. outside diameter was used as the reaction vessel. Both gas mixtures were preheated to 396° C. and then blended in the reaction vessel. The gases were supplied at a temperature of 24° C. under 750 mm. pressure. The reaction was carried out at approximately atmospheric pressure. The reaction gases were immediately cooled and the condensate collected.

The condensate was sweetened with an aqueous paste of either sodium or potassium carbonate for a few days, and then fractionated under a large reflux ratio, first at 100 mm. pressure and then at 22 mm. pressure. The distillate coming over under 90° C. polymerized very rapidly. After about two-thirds of the condensate had been distilled the residue was very viscous and evolved large quantities of hydrogen chloride.

What we claim is:

1. The method of chlorinating the terminal carbons of 1,3-butadiene without substantial chlorination of the non-terminal carbons, with the production of mono-, di-, tri- and tetrachlorobutadienes, which comprises reacting two to three volumes of 1,3-butadiene with three volumes of chlorine, in one to three volumes of an inert atmosphere per volume of reactants, at atmospheric pressure at a temperature of 350° C. to 450° C. for a reaction period of substantially 0.25 to 4 seconds, and rapidly cooling the reaction product.

2. The method of chlorinating the terminal carbons of 1,3-butadiene without substantial chlorination of the non-terminal carbons, with the production of mono-, di- tri- and tetrachlorobutadienes, which comprises two to three volumes of 1,3-butadiene with one to three volumes of carbon dioxide per volume of the butadiene, mixing three volumes of chlorine with three to nine volumes of carbon dioxide, separately heating each gas mixture and then mixing the heated gases and reacting at atmospheric pressure at 350° C. to 450° C. for a reaction period of substantially 0.25 to 4 seconds, and rapidly cooling the reaction product.

3. The method of chlorinating the terminal carbons of 1,3-butadiene without substantial chlorination of the non-terminal carbons, with the production of mono-, di-, tri- and tetra-chlorobutadienes, which comprises continuously reacting a stream of two to three volumes of 1,3-butadiene with a stream of three volumes of chlorine, in one to three volumes of an inert atmosphere per volume of reactants for a reaction period of substantially 0.25 to 4 seconds, by bringing the streams together at an angle of only a relatively few degrees from one another at atmospheric pressure and a temperature of 350° C. to 450° C., and rapidly cooling the reaction product.

KENNETH C. EBERLY.
ROBERT J. REID.

REFERENCES CITED

The following references are of record in the file of this patent:

UNITED STATES PATENTS

| Number | Name | Date |
|---|---|---|
| 2,281,096 | Engs et al. | Apr. 28, 1942 |
| 2,284,479 | Rust et al. | May 26, 1942 |
| 2,299,477 | Hearne et al. | Oct. 20, 1942 |

FOREIGN PATENTS

| Number | Country | Date |
|---|---|---|
| 879,785 | France | Mar. 4, 1943 |

OTHER REFERENCES

Groggins "Unit Processes in Organic Synthesis," pages 186-7 (1947).